US011942696B1

(12) United States Patent
Cohen et al.

(10) Patent No.: US 11,942,696 B1
(45) Date of Patent: Mar. 26, 2024

(54) INTEGRATED CIRCUIT CHIPS FOR A PHASED ARRAY SYSTEM INCLUDING PROGRAMMABLE ON-CHIP ELEMENT SWAPPING, CHANNEL SWAPPING, AND/OR PHASE ROTATION CIRCUITRY

(71) Applicant: Anokiwave, Inc., San Diego, CA (US)

(72) Inventors: Lewis N. Cohen, San Diego, CA (US); Robert J. McMorrow, Concord, MA (US); Jason Leo Durbin, San Diego, CA (US); Vipul Jain, Irvine, CA (US)

(73) Assignee: Anokiwave, Inc., San Diego, CA (US)

( * ) Notice: Subject to any disclaimer, the term of this patent is extended or adjusted under 35 U.S.C. 154(b) by 0 days.

(21) Appl. No.: 17/737,567

(22) Filed: May 5, 2022

Related U.S. Application Data

(60) Provisional application No. 63/185,044, filed on May 6, 2021.

(51) Int. Cl.
| | |
|---|---|
| *H01Q 3/34* | (2006.01) |
| *G06K 7/10* | (2006.01) |
| *G06K 19/073* | (2006.01) |
| *H01Q 1/22* | (2006.01) |

(52) U.S. Cl.
CPC ........... *H01Q 3/34* (2013.01); *G06K 7/10019* (2013.01); *G06K 19/07345* (2013.01); *H01Q 1/2208* (2013.01)

(58) Field of Classification Search
CPC .... H01Q 3/34; H01Q 1/2208; G06K 7/10019; G06K 19/07345
See application file for complete search history.

(56) References Cited

U.S. PATENT DOCUMENTS

| | | | |
|---|---|---|---|
| 10,566,952 B1* | 2/2020 | Lin ........................ H03H 11/20 |
| 10,686,523 B1* | 6/2020 | Gleason ............... H01Q 21/065 |
| 11,283,150 B2* | 3/2022 | Arai ...................... H01Q 1/2208 |
| 2019/0214703 A1* | 7/2019 | Choi .................... H01Q 21/061 |
| 2020/0328496 A1* | 10/2020 | Kobayashi ............... H03H 7/18 |
| 2021/0036404 A1* | 2/2021 | Lee ........................... H01Q 1/22 |
| 2021/0320419 A1* | 10/2021 | Jeong .................... H01Q 21/08 |
| 2022/0029272 A1* | 1/2022 | Hong ........................ H01Q 3/34 |
| 2022/0094408 A1* | 3/2022 | Park ...................... H04B 7/0695 |
| 2022/0181766 A1* | 6/2022 | Mori ...................... H01Q 13/10 |
| 2022/0352622 A1* | 11/2022 | Choudhury ............. H04W 4/40 |

* cited by examiner

*Primary Examiner* — Thien M Le
(74) *Attorney, Agent, or Firm* — Nutter McClennen & Fish LLP

(57) ABSTRACT

Exemplary embodiments include RF integrated circuit (RFIC) chips including programmable on-chip element swapping circuitry, channel swapping circuitry, and/or phase rotation circuitry to allow a common software implementation or parameter computation to be used across multiple products having different arrangements and orientations of RFICs and elements.

20 Claims, 12 Drawing Sheets
(3 of 12 Drawing Sheet(s) Filed in Color)

Digital AB Swap

RF AB Swap

INTEGRATED CIRCUIT CHIPS FOR A PHASED ARRAY SYSTEM INCLUDING PROGRAMMABLE ON-CHIP ELEMENT SWAPPING, CHANNEL SWAPPING, AND/OR PHASE ROTATION CIRCUITRY

CROSS-REFERENCE TO RELATED APPLICATION(S)

This patent application claims the benefit of U.S. Provisional Patent Application No. 63/185,044 entitled INTEGRATED CIRCUIT CHIPS FOR A PHASED ARRAY SYSTEM INCLUDING PROGRAMMABLE ON-CHIP ELEMENT, CHANNEL SWAPPING, AND/OR PHASE ROTATION CIRCUITRY filed May 6, 2021, which is hereby incorporated herein by reference in its entirety.

FIELD OF THE INVENTION

The invention generally relates to phased array systems, and, more particularly, to integrated circuits having programmable on-chip element swapping circuitry, channel swapping circuitry, and/or phase rotation circuitry.

BACKGROUND OF THE INVENTION

Antennas that emit electronically steered beams are known in the art as "phased array antennas." Such antennas are used worldwide in a wide variety of commercial applications. They typically are produced from many small radiating elements that are individually phase controlled to form a beam in the far field of the antenna.

Among other things, phased array antennas are popular due to their ability to rapidly steer beams without requiring moving parts.

Configuration of phased array systems can be complex and error-prone due at least in part to the use of integrated circuits and elements that can be arranged and oriented differently in different products.

SUMMARY OF VARIOUS EMBODIMENTS

Exemplary embodiments include RF integrated circuit (RFIC) chips including programmable on-chip element swapping circuitry, channel swapping circuitry, and/or phase rotation circuitry to allow a common software implementation or parameter computation to be used across multiple products having different arrangements and orientations of RFICs and elements.

In one embodiment, an RFIC chip comprises a common interface circuit including a first common interface and a second common interface, at least one element interface circuit coupled to the common interface circuit where each element interface circuit includes a first element interface including a first 180 degree phase shifter and a second element interface including a second 180 degree phase shifter, programmable channel swapping circuitry configured to selectively switch between a first channel configuration and a second channel configuration based on a channel swap parameter, and programmable phase rotation circuitry configured to selectively enable or disable the 180 degree phase shifter of each element interface based on a corresponding element rotation parameter. The first channel configuration couples the first common interface to the first element interface of each element interface circuit and couples the second common interface to the second element interface of each element interface circuit. The second channel configuration couples the first common interface to the second element interface of each element interface circuit and couples the second common interface to the first element interface of each element interface circuit.

In various alternative embodiments, the programmable channel swapping circuitry may include switching circuitry having a first input coupled to the first common interface, a second input coupled to the second common interface, a first output coupled to the first element interface of each element interface circuit, a second output coupled to the second element interface of each element interface circuit, and a switch for selectively switching between a first switch configuration and a second switch configuration based on the channel swap parameter, the first switch configuration corresponding to the first channel configuration and coupling the first switch input to the first switch output and coupling the second switch input to the second switch output, the second switch configuration corresponding to the second channel configuration and coupling the first switch input to the second switch output and coupling the second switch input to the first switch output.

In further alternative embodiments, the RFIC chip may further include at least one memory storing a first set of gain and phase parameters and a second set of gain and phase parameters for each element interface circuit and may further include parameter swapping circuitry configured to selectively switch each element interface circuit between a first parameter configuration corresponding to the first channel configuration and a second parameter configuration corresponding to the second channel configuration based on the channel swap parameter, the first parameter configuration providing the first set of parameters to the first element interface and providing the second set of parameters to the second element interface, the second parameter configuration providing the first set of parameters to the second element interface and providing the second set of parameters to the first element interface. The parameter swapping circuitry may include first switching circuitry configured to selectively switch the gain parameters and second switching circuitry configured to selectively switch the phase parameters.

In further alternative embodiments, the RFIC chip may include a plurality of element interface circuits. In such case, the RFIC chip may include at least one memory storing a set of gain and phase parameters for each element interface circuit including at least a first set of gain and phase parameters for a first element interface circuit and a second set of gain and phase parameters for a second element interface circuit and may further include programmable element swapping circuitry configured selectively switch between a first element configuration and a second element configuration based on an element swap parameter, the first element configuration providing the first set of gain and phase parameters to the first element interface circuit and providing the second set of gain and phase parameters to the second element interface circuit, the second element configuration providing the first set of gain and phase parameters to the second element interface circuit and providing the second set of gain and phase parameters to the first element interface circuit. The element swapping circuitry may be configured to digitally switch the sets of parameters. The element swapping circuitry and the channel swapping circuitry may be controlled through a common parameter, which may be an orientation parameter based on an orientation of the RFIC chip relative to a reference orientation that may indicate an angle of rotation from the reference orientation.

Embodiments also may include phased array systems including one or more of the above-described RFIC chips.

Additional embodiments may be disclosed and claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Definitions. As used in this description and the accompanying claims, the following terms shall have the meanings indicated, unless the context otherwise requires:

A "set" includes one or more members.

A "beam forming element" (sometimes referred to simply as an "element" or "radiating element") is an element that is used to transmit and/or receive a signal for beam forming. Different types of beam forming elements can be used for different beam forming applications. For example, the beam forming elements may be radio frequency (RF) antennas for RF applications (e.g., radar, wireless communication system such as applications, satellite communications, etc.), ultrasonic transducers for ultrasound applications, optical transducers for optical applications, microphones and/or speakers for audio applications, etc. Typically, the signal provided to or from each beam forming element is independently adjustable, e.g., as to gain/amplitude and phase.

A "beam-formed signal" is a signal produced by or from a plurality of beam forming elements. In the context of the present invention, there is no requirement that a beam-formed signal have any particular characteristics such as directionality or coherency.

A "phased array system" is a system that includes a plurality of beam forming elements and related control logic for producing and adapting beam-formed signals. A phased array system may be referred to herein as a "phased array antenna" or "active electronically steered antenna" or simply as a "phased array."

For convenience, the term "beam forming" is sometimes abbreviated herein as "BF."

Various embodiments are described herein in the context of active electronically steered antenna (AESA) systems also called Active Antenna, although the present invention is in no way limited to AESA systems. AESA systems form electronically steerable beams that can be used for a wide variety of applications. Although certain details of various embodiments of an AESA system are discussed below, those skilled in the art can apply some embodiments to other AESA systems. Accordingly, discussion of an AESA system does not necessarily limit certain other embodiments.

Figure 1:
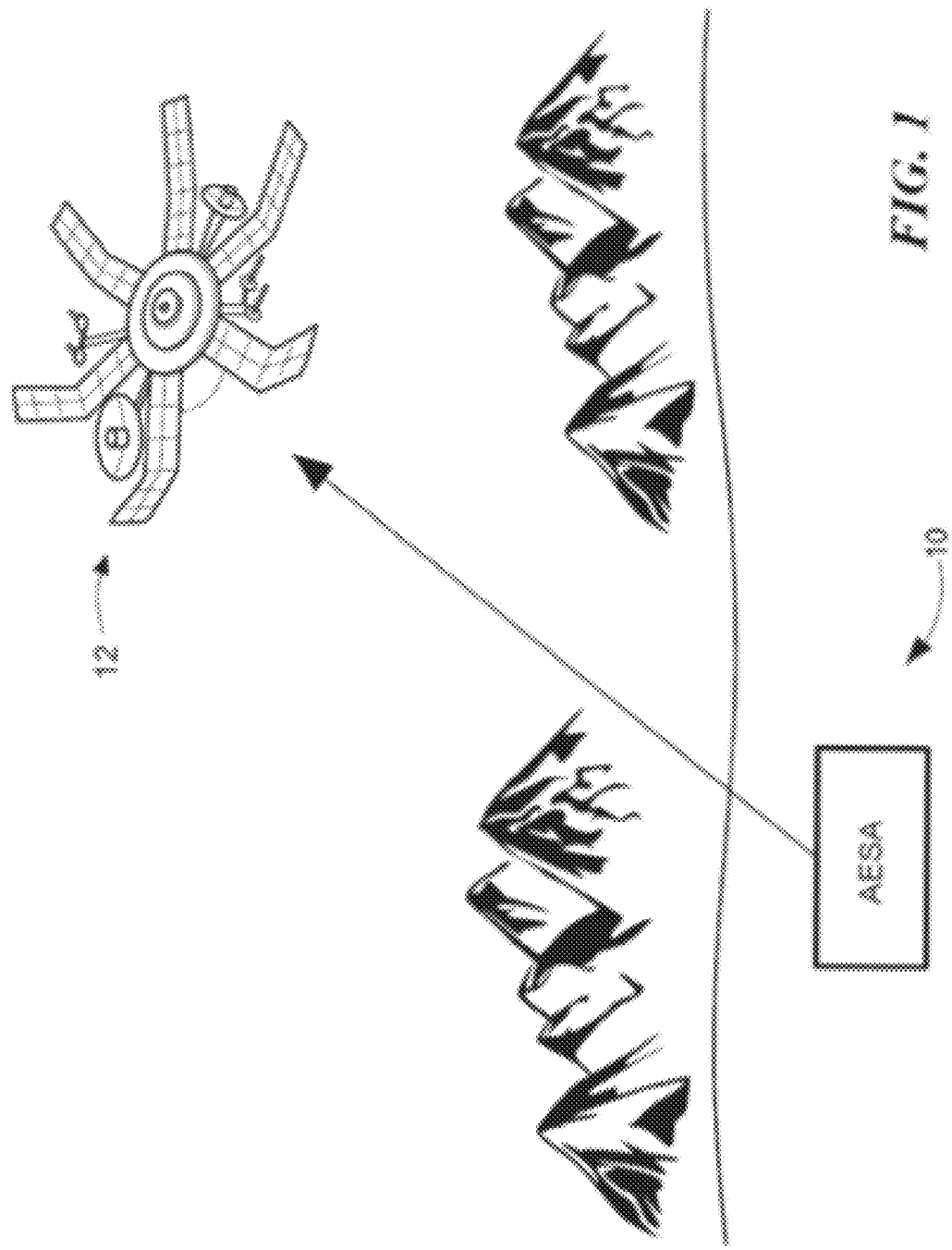
FIG. 1 schematically shows an active electronically steered antenna system ("AESA system") configured in accordance with certain illustrative embodiments of the invention and communicating with an orbiting satellite.

FIG. 1 schematically shows an active electronically steered antenna system ("AESA system 10") configured in accordance with certain illustrative embodiments of the invention and communicating with an orbiting satellite 12. A phased array (discussed in more detail below and referenced as phased array 10A) implements the primary functionality of the AESA system 10. Specifically, as known by those skilled in the art, the phased array forms one or more of a plurality of electronically steerable beams that can be used for a wide variety of applications. As a satellite communication system, for example, the AESA system 10, preferably is configured operate at one or more satellite frequencies. Among others, those frequencies may include the Ka-band, Ku-band, and/or X-band. Of course, as satellite communication technology progresses, future implementations may modify the frequency bands to communicate using new satellite frequencies.

Figure 2:
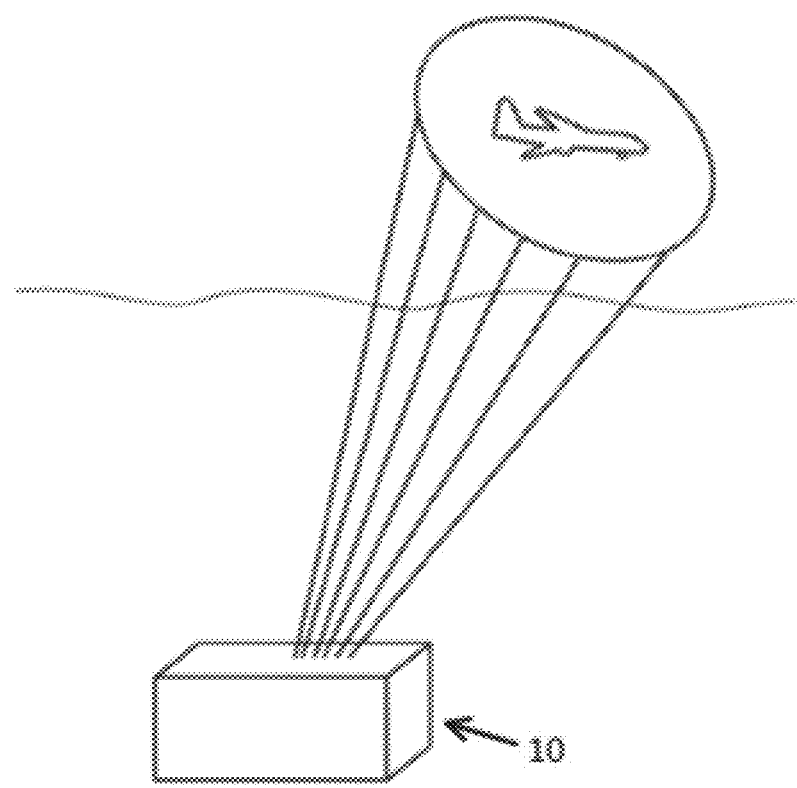
FIG. 2 schematically shows an AESA system configured in accordance with certain illustrative embodiments of the invention and implemented as a radar system in which a beam-formed signal may be directed toward an aircraft or other object in the sky (e.g., to detect or track position of the object).

FIG. 2 schematically shows an AESA system 10 configured in accordance with certain illustrative embodiments of the invention and implemented as a radar system in which a beam-formed signal may be directed toward an aircraft or other object in the sky (e.g., to detect or track position of the object).

Figure 3:
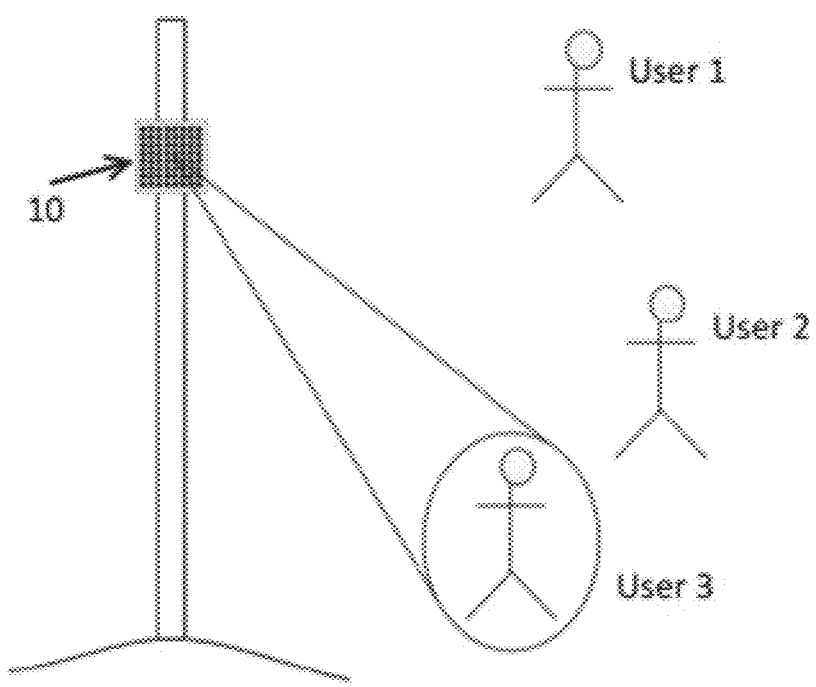
FIG. 3 schematically shows an AESA system 10 configured in accordance with certain illustrative embodiments of the invention and implemented as a wireless communication system (e.g., 5G) in which a beam-formed signal may be directed toward a particular user (e.g., to increase the effective transmit range of the AESA system or to allow for greater frequency reuse across adjacent or nearby cells).

FIG. 3 schematically shows an AESA system 10 configured in accordance with certain illustrative embodiments of the invention and implemented as a wireless communication system (e.g., 5G) in which a beam-formed signal may be directed toward a particular user (e.g., to increase the effective transmit range of the AESA system or to allow for greater frequency reuse across adjacent or nearby cells). Of course, other implementations may include other types of wireless communication systems.

Of course, those skilled in the art use AESA systems 10 and other phased array systems in a wide variety of other applications, such as RF communication, optics, sonar, ultrasound, etc. Accordingly, discussion of satellite, radar, and wireless communication systems are not intended to limit all embodiments of the invention.

The satellite communication system may be part of a cellular network operating under a known cellular protocol, such as the 3G, 4G (e.g., LTE), or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

The AESA system 10 typically includes a number of integrated circuits for generating transmit signals and/or processing receive signals. For convenience, such integrated circuits used in RF applications may be referred to herein generally as RFICs. In certain exemplary embodiments, the AESA system 10 includes X beam forming RF integrated circuits (BFICs), with each BFIC supporting Y beam forming elements (e.g., 2 or 4 beam forming elements per BFIC, although not limited to 2 or 4). Thus, such a phased array generally includes (X*Y) beam forming elements.

Figure 4:
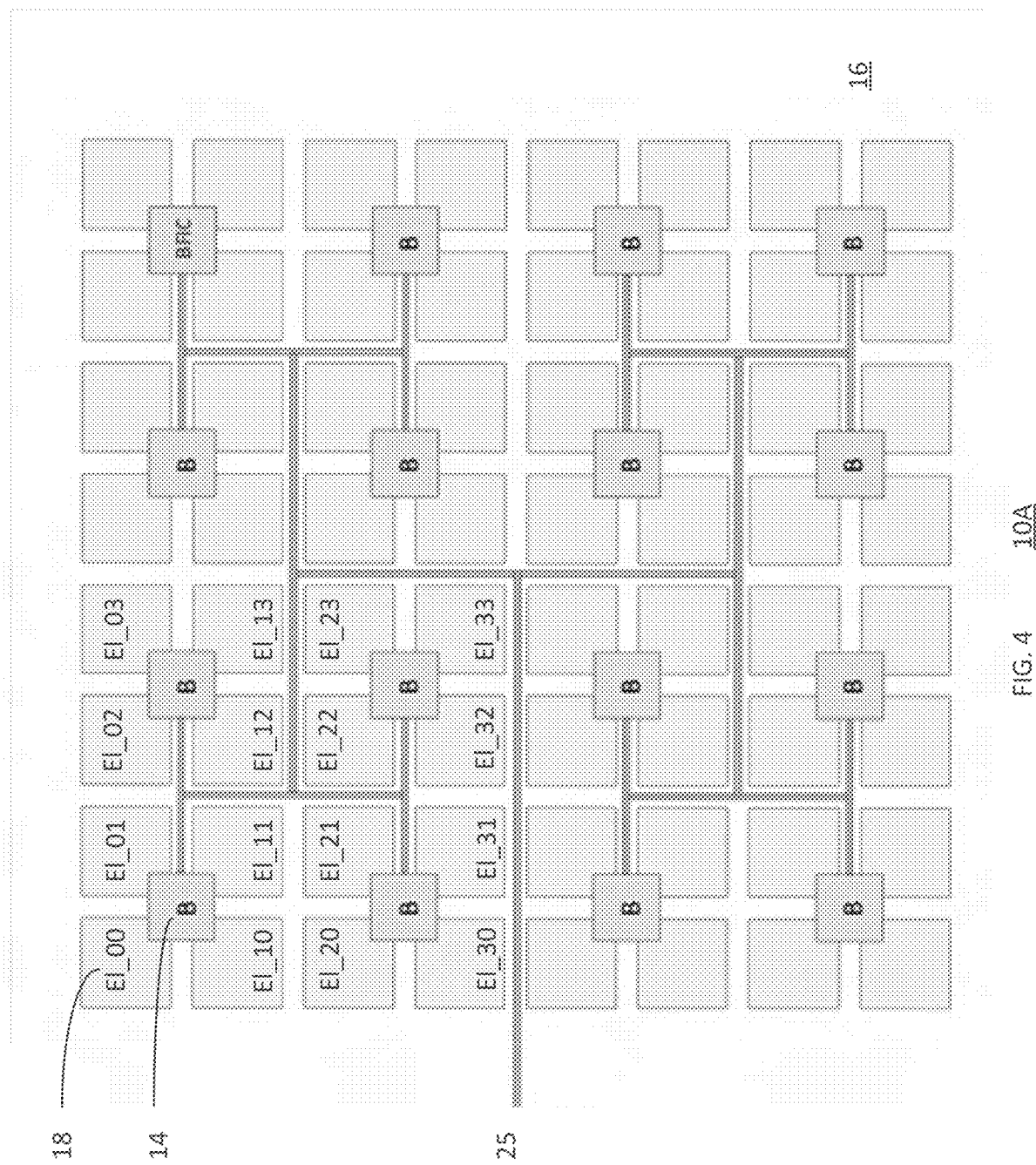
FIG. 4 is a schematic diagram showing a plan view of a portion of an AESA system in which each beam forming integrated circuit is connected to four beam forming elements, in accordance with illustrative embodiments of the invention.

FIG. 4 is a schematic diagram showing a plan view of a portion 10A of an AESA system 10 in which each beam forming integrated circuit 14 (labeled "BFIC" or "B") is connected to four beam forming elements 18, in accordance with illustrative embodiments of the invention. Each BFIC 14 aggregates signals to/from its connected beam forming elements 18 as part of a common beam forming signal 25. In certain exemplary embodiments, the beam forming elements 18 may be implemented as patch antennas that are formed on one side of a laminar printed circuit board, although it should be noted that the present invention is not limited to patch antennas or to a laminar printed circuit board.

Preferably, the AESA system 10A of FIG. 4 is implemented as a laminar phased array having a laminated printed circuit board 16 acting as the substrate supporting the above noted plurality of beam forming elements 18 and beam forming integrated circuits 14. The elements 18 preferably are formed as a plurality of square or rectangular patch antennas oriented in a patch array configuration with the beam forming elements 18 that are physically or logically arranged in rows and columns (e.g., the element in row 0 column 0 is labeled El_00, the element in row 0 column 1 is labeled El_01, etc.), and this type of arrangement will be used below as a frame of reference in discussing various exemplary embodiments. However, it should be noted that other embodiments may use other patch configurations, such as a triangular configuration in which each integrated circuit is connected to three elements 18, a pentagonal configuration in which each integrated circuit is connected to five elements 18, or a hexagonal configuration in which each integrated circuit is connected to six elements 18. Like other similar phased arrays, the printed circuit board 16 also may have a ground plane (not shown) that electrically and magnetically cooperates with the elements 18 to facilitate operation. In exemplary embodiments, the BFICs are mounted to a back side of the printed circuit board opposite the side containing the patch antennas (e.g., with through-PCB vias and traces that connect to the elements 18, with such connections typically made using impedance controlled lines and transitions), although in alternative embodiments, the BFICs may be mounted to the same side of the printed circuit board as the patch antennas.

As a patch array, the elements 18 have a low profile. Specifically, as known by those skilled in the art, a patch antenna (i.e., the element 18) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field. Illustrative embodiments may form the patch antennas using conventional semiconductor fabrication processes, such as by depositing one or more successive metal layers on the printed circuit board 16. Accordingly, using such fabrication processes, each element 18 in the phased array 10A should have a very low profile. It should be noted that embodiments of the present invention are not limited to rectangular-shaped elements 18 but instead any appropriate shape such as circular patches, ring resonator patches, or other shape patches may be used in other particular embodiments.

The phased array 10A can be configured for transmit-only, receive-only, or dual-mode (i.e., transmit and receive) operation. In a dual mode configuration, the phased array 10A generally will be in either a transmit mode or a receive mode at any given time, although technically it may be possible to have different portions of the phased array 10A operating in different modes at the same time.

The AESA system 10 has a plurality of the above noted beam forming integrated circuits 14 for controlling operation of the elements 18. Those skilled in the art sometimes refer to these integrated circuits 14 as "beam steering integrated circuits." Each integrated circuit 14 preferably is configured with at least the minimum number of functions to accomplish the desired effect. Indeed, integrated circuits 14 for dual mode (transmit and receive) elements 18 are expected to have some different functionality than that of the integrated circuits 14 for transmit-only operation or receive-only operation. Accordingly, integrated circuits 14 for such non-dual-mode elements 18 may have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:
- phase shifting,
- amplitude controlling/beam weighting,
- switching between transmit mode and receive mode,
- output amplification to amplify output signals to the elements 18,
- input amplification for received RF signals (e.g., signals received from the satellite 12), and
- power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active phase shifters, and the switching functionality may be implemented using conventional transistor-based switches. Additional details of the structure and functionality of integrated circuits 14 are discussed below.

In illustrative embodiments, each integrated circuit 14 supports multiple elements 18, thus reducing the required total number of integrated circuits 14 in a given AESA system 10. This reduced number of integrated circuits 14 correspondingly reduces the cost of the AESA system 10. In addition, more surface area on the printed circuit board 16 may be dedicated to the elements 18 and/or to other components.

To that end, each integrated circuit 14 preferably operates on at least one element 18 in the array and typically operates on a plurality of elements 18. For example, as discussed above, one integrated circuit 14 can operate on two, three, four, five, six, or more different elements 18. Of course, those skilled in the art can adjust the number of elements 18 sharing an integrated circuit 14 based upon the application. For example, a single integrated circuit 14 can control two elements 18, three elements 18, four elements 18, five elements 18, six elements 18, seven elements 18, eight elements 18, etc., or some range of elements 18. Sharing the integrated circuits 14 between multiple elements 18 in this manner reduces the required total number of integrated circuits 14, which can correspondingly reduce the required size of the printed circuit board 16 and cost of the system.

As noted above, in certain embodiments, the phased array 10A may alternately and selectively operate in a transmit mode or a receive mode. To that end, the integrated circuits 14 may generate time division diplex or duplex waveforms so that a single aperture or phased array 10A can be used for both transmitting and receiving. In a similar manner, some embodiments may eliminate a commonly included transmit/receive switch in the side arms of the integrated circuit 14. Instead, such embodiments may duplex at the elements 18. This process can be performed by isolating one of the elements 18 between transmit and receive by an orthogonal feed connection. Such a feed connection may eliminate about a 0.8 dB switch loss and improve G/T (i.e., the ratio of the gain or directivity to the noise temperature) by about 1.3 dB for some implementations.

Generally speaking, RF interconnect and/or beam forming lines (not shown in FIG. 4) electrically connect each integrated circuit 14 to its respective elements 18. Illustrative embodiments mount the integrated circuits 14 as close to their respective elements 18 as possible in order to reduce or minimize feed loss through these connections. Specifically, this close proximity preferably reduces RF interconnect line lengths, reducing the feed loss. To that end, each integrated circuit 14 preferably is packaged either in a flip chip, chip scale package (e.g., FC-CSP), wafer level chip scale package (WLCSP), or other configuration such as extended wafer level ball-grid-array (eWLB) that supports flip chip, or a traditional package, such as quad flat no-leads package (QFN package).

It should be reiterated that although FIG. 4 shows an exemplary phased array 10A with some specificity (e.g., specific layouts of the elements 18 and integrated circuits 14), those skilled in the art may apply illustrative embodiments to other implementations. For example, each integrated circuit 14 can connect to more or fewer elements 18, or the lattice configuration can be different. Accordingly, discussion of the specific configurations of the AESA system 10 shown in FIG. 4 is for convenience only and not intended to limit all embodiments.

Figure 5:
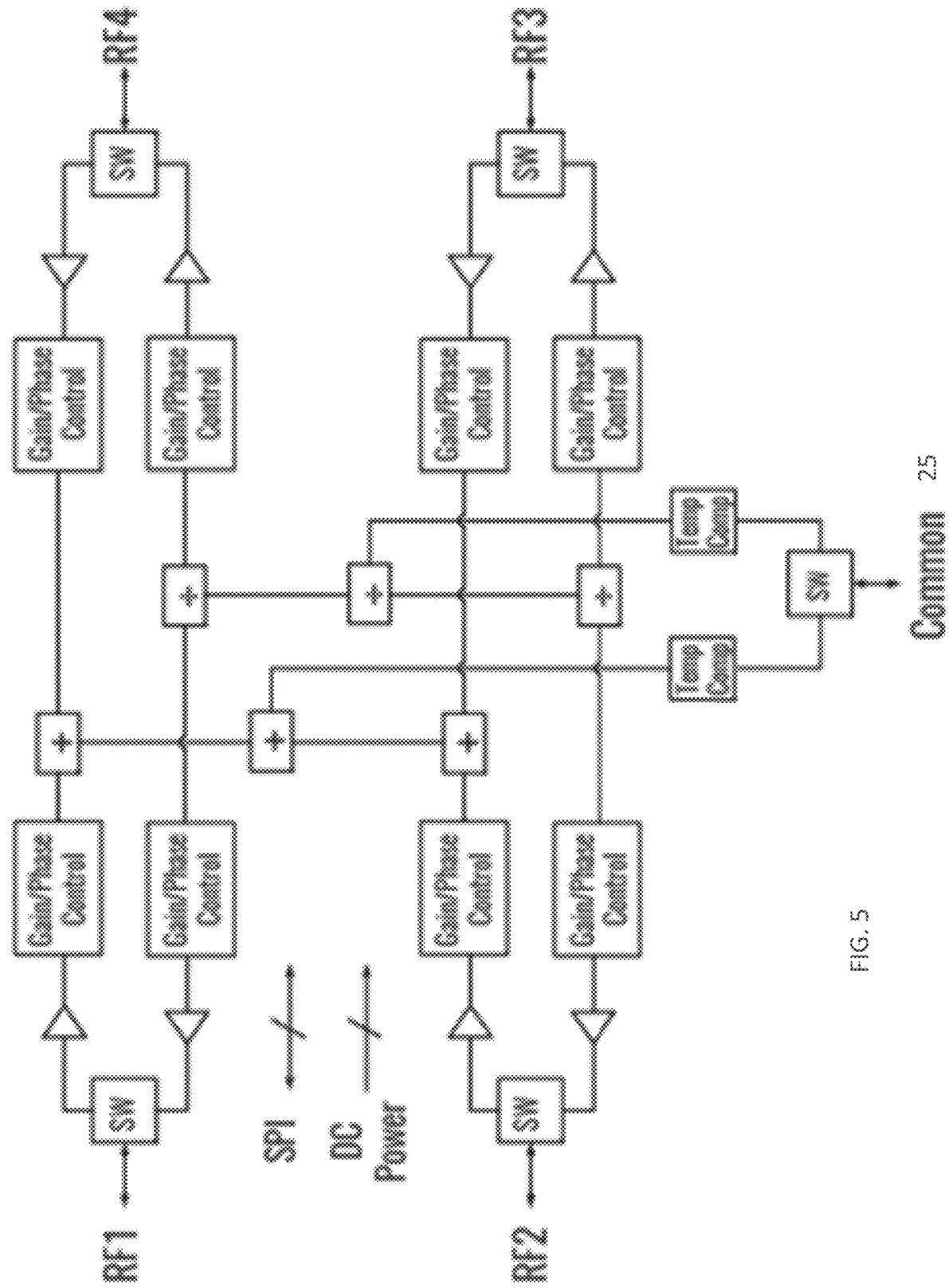
FIG. 5 is a schematic diagram showing relevant components of a BFIC chip configured to support four beam forming elements, in accordance with one exemplary embodiment.

FIG. 5 is a schematic diagram showing relevant components of a BFIC chip configured to support four beam forming elements 18, in accordance with one exemplary embodiment. The BFIC chip here includes a common port and four RF ports. In this exemplary embodiment, the BFIC chip supports both transmit and receive modes, which can be controlled via various switches (SW). Specifically, each RF port is associated with a transmit signal path including a transmit gain/phase control circuit and a receive signal path including a receive gain/phase control circuit. The transmit and receive gain/phase control circuits can be switched into and out of the common beam forming signal 25 via the switches. The transmit gain/phase control circuit typically includes a variable gain amplifier (VGA), an adjustable phase circuit (Ø), and a power amplifier (PA) stage. The receive gain/phase control circuit typically includes a low noise amplifier (LNA) stage, an adjustable phase circuit (Ø), and a variable gain amplifier (VGA). In the transmit mode, common transmit signals 25 presented on the common port are distributed to the transmit gain/phase control circuits, which output transmit signals to their respective RF ports (e.g., to beam forming elements 18). In the receive mode, receive signals from the RF ports (e.g., from beam forming elements 18) are processed by the respective receive gain/phase control circuits and are combined to output combined receive signals 25 on the common port.

Certain exemplary embodiments can include other types of RFICs. For example, in certain exemplary embodiments, signals to/from a number of BFIC chips can be aggregated by a conditioning integrated circuit (CDIC) chip or an interface integrated circuit (IFIC) chip, and signals to/from a number of CDIC chips (if included) can be aggregated by an interface integrated circuit (IFIC) chip. In certain exemplary embodiments, each BFIC chip supports four beam forming elements (i.e., each BFIC includes a common port and four RF ports), although alternative embodiments can support other numbers of beam forming elements (e.g., two, four, eight, etc.). Signals to/from groups of BFIC chips can be aggregated to a single IFIC chip optionally through a network of interconnected CDIC chips. In certain exemplary embodiments, each CDIC chip supports connections to two BFIC chips or other to two other CDIC chips (i.e., each CDIC chip includes a common port and two RF ports), although alternative embodiments can support other numbers of connections (e.g., four, eight, etc.). In certain exemplary embodiments, each IFIC chip supports a single RF connection (i.e., each IFIC chip includes a common port and single RF port), although alternative embodiments can support other numbers of connections (e.g., two, four, eight, etc.). The BFIC chips, CDIC chips, and/or IFIC chips can be used to create different sized arrays and sub-arrays (e.g., having 64 beam forming elements or having 256 beam forming elements), and in some embodiments multiple sub-arrays are used to form larger arrays.

In certain exemplary embodiments, IFIC chips perform frequency translation (e.g., up/down conversion) between an intermediate frequency (IF) used on a common port and higher frequencies used on an RF port. For example, the IFIC chip may include a 4× multiplier using a 5.65 GHz reference signal for up/down converting the signals by approximately 22.6 GHz. When the IFIC chip is in the transmit mode, the transmit signal from the IF side is up-converted to a higher frequency range used by the RF side, and when the IFIC chip is in the receive mode, the receive signal from the RF side is down-converted to the lower-frequency range used by the IF side. In certain exemplary embodiments, the IF side operates in approximately the 4.875-5.725 GHz frequency range, while the RF side operates in approximately the 27.5-28.35 GHz frequency range.

In certain exemplary embodiments, CDIC chips perform signal conditioning and distribution, which, among other things, can provide scalability to larger arrays, provide flexibility to adjust gain distribution to optimize RF parameters, can allow for relaxation of gain requirements on the BFIC chips in order to lower risk of ripple and oscillation, and can allow for phase adjustment across sub-arrays.

Thus, one exemplary embodiment includes a chipset including BFIC chips, CDIC chips, and/or IFIC chips that can be used in various combinations in order to produce various array and sub-array configurations. In exemplary embodiments, the three types of chips (CDIC, BFIC and IFIC) can be combined in a modular fashion and in combination they can create arbitrary arrays of any form factor and size. Some or all of the BFIC, IFIC, and/or CDIC functions also can be combined into a single IC. In typical situations, there are many antenna elements and thus many BFICs, but only a small number of CDIC and/or IFIC chips. The ability to form arbitrary arrays is very useful for 5G arrays such as those used for base station, consumer premise equipment, and user equipment (such cell phones).

It should be noted that each type of RFIC can include a transmit signal path and/or a receive signal path to allow for transmit-only, receive-only, or dual-mode configurations.

It also should be noted that one or more of the RFIC types may include temperature compensation (Temp Comp) circuitry to adjust the gain of the transmit and receive signals as a function of temperature based on inputs from a temperature sensor. For example, temperature compensation circuitry may include a digital attenuator that is controlled based on the sensed temperature such that when temperature decreases such that the gain would increase, attenuation is increased in order provide the desired amount of gain, and when temperature increases such that gain would decrease, attenuation is decreased in order to provide the desired amount of gain. FIG. 5 is a schematic diagram showing how temperature compensation circuitry might be used in a BFIC chip for performing temperature compensation on the transmit signal prior to distribution to the four RF signal paths during transmit mode and for performing temperature compensation on the combined receive signal from the four RF signal paths during receive mode. CDIC and/or IFIC chips can include similar temperature compensation circuitry. Temperature compensation can be performed, for example, using variable attenuators (e.g., digital attenuators) that are controlled based on the sensed temperature or by adjusting the gain of the transmit and receive RF amplifiers based on the sensed temperature.

Generally, each RFIC includes a set of registers for controlling operational parameters such as gain and phase parameters (sometimes referred to as "beam weights" or "complex beam weights"). In certain exemplary embodiments, the common port and each RF port of each RFIC may be configured for two or more RF channels, e.g., to support multiple transmit/receive signals or polarizations. In this case, the set of registers generally includes operational parameters for each of the RF channels. The AESA system 10 generally includes a controller that configures the operational parameters of the RFICs.

For example, each dual transmit/receive integrated circuit may have separate transmit and receive interfaces for each element it controls. For example, if a given integrated circuit controls two elements, it may have a first pair of transmit and receive interfaces for the first element and a second pair of transmit and receive interfaces for the second element. Each transmit interface and receive interface on an integrated circuit respectively couples to corresponding transmit and receive interfaces on one of the elements. To provide signal isolation, the two interfaces on each element may be polarized out of phase with each other. For example, a given element's transmit interface may be about 90 degrees out of phase with its receive interface.

In certain embodiments, RFICs include on-chip circuitry to perform element swapping, channel swapping, and/or phase rotation as necessary or desirable for a given implementation or product through a simple configuration interface. As discussed below, inclusion of such circuitry can greatly simplify configuration and control of the RFICs in the phase array system.

Some exemplary embodiments are now described with reference to the configuration shown in FIG. 6, which is a schematic diagram of a BFIC controlled over a digital communication bus by a controller, in accordance with one exemplary embodiment. The controller can be, for example, a microcontroller, a CPU, a Field Programmable Gate Array (FPGA), or an Application-Specific IC (ASIC). The communication bus can be any digital interface such as, for example, a synchronous peripheral interface (SPI) bus, an Inter-IC Communication (I2C) bus, a General Purpose I/O (GPIO) bus, or other communication interface. In this example, the BFIC 14 includes two signal channels (labeled A and B) such as for horizontal and vertical polarizations per element 18 (labeled h and v, respectively). The arrangement and orientation of the BFIC chip and antennas shown in FIG. 6 relative to the nominal 0° position is used as a frame of reference for further discussion below, e.g., with element El_00 associated with element RF ports 3A/3B, element El_01 associated with element RF ports 2A/2B, element El_10 associated with element RF ports 4A/4B, and element El_11 associated with element RF ports 1A/1B. BFIC 14 also includes two common RF ports labelled A and B, with common RF port A typically coupled to the "A" element RF ports (i.e., element RF ports 1A, 2A, 3A, 4A) and with common RF port B typically coupled to the "B" element RF interfaces (i.e., element RF ports 1B, 2B, 3B, 4B). FIG. 7 is a schematic diagram of inner circuitry of the BFIC chip of FIG. 6 along with a representation of a set of addressable registers with fields for controlling gain and phase parameters for each BFIC signal path, in accordance with one exemplary embodiment. As shown, in this example, each element RF port is associated with gain/phase circuitry and corresponding gain and phase registers.

Figure 6:
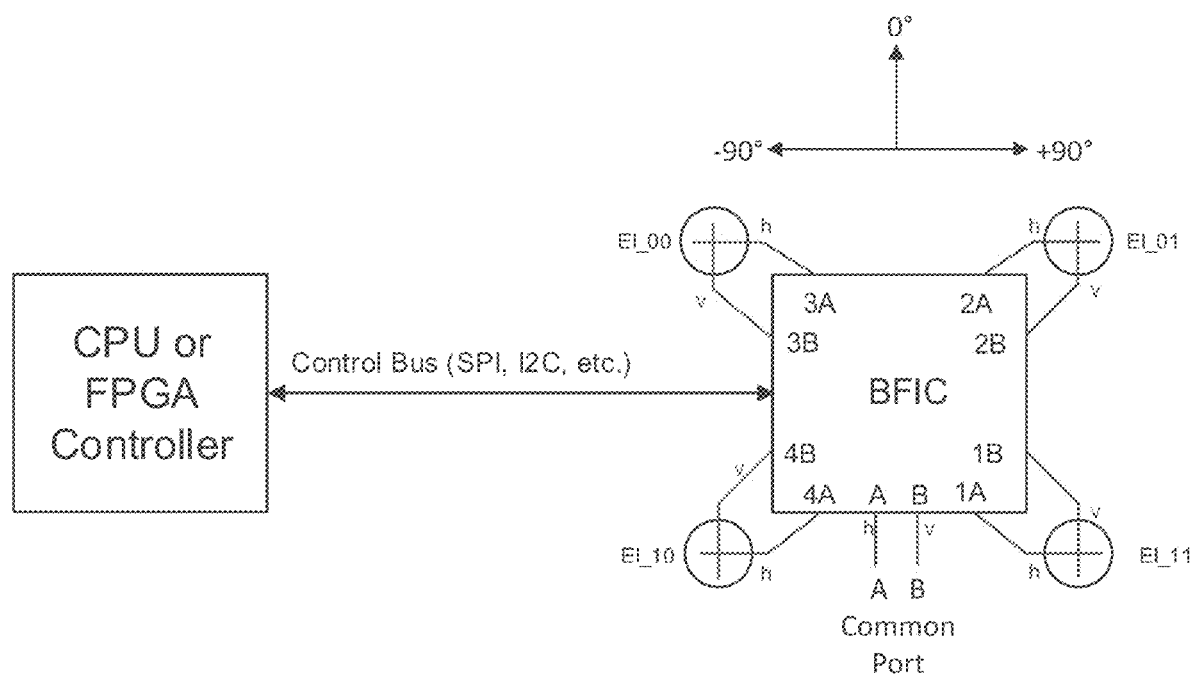
FIG. 6 is a schematic diagram showing a reference configuration used to describe various exemplary embodiments.
Figure 7:
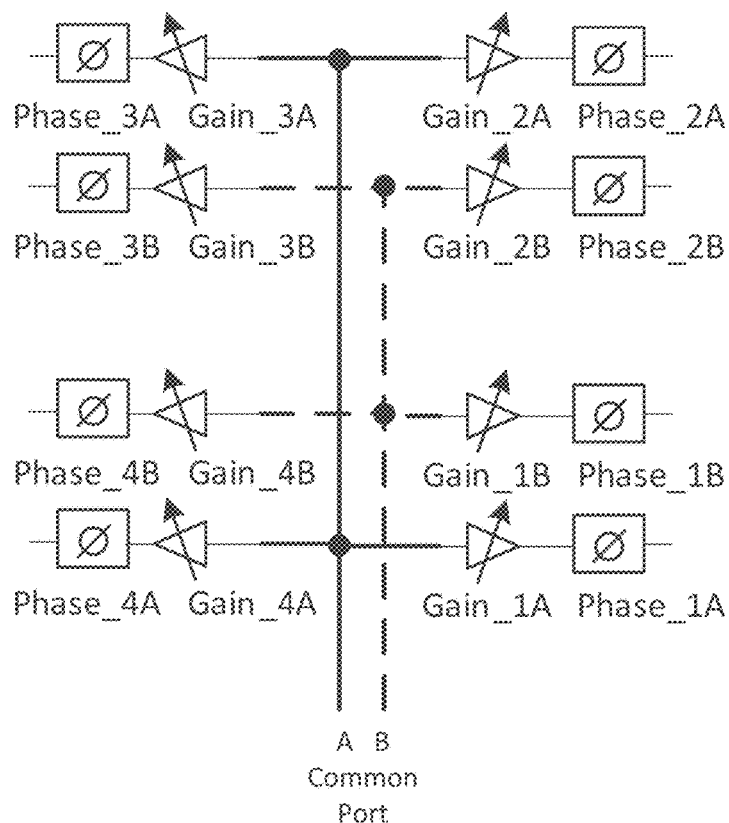
FIG. 7 is a schematic diagram of inner circuitry of the BFIC chip of FIG. 6 along with a representation of a set of addressable registers with fields for controlling gain and phase parameters for each BFIC signal path, in accordance with one exemplary embodiment.
Figure 8:
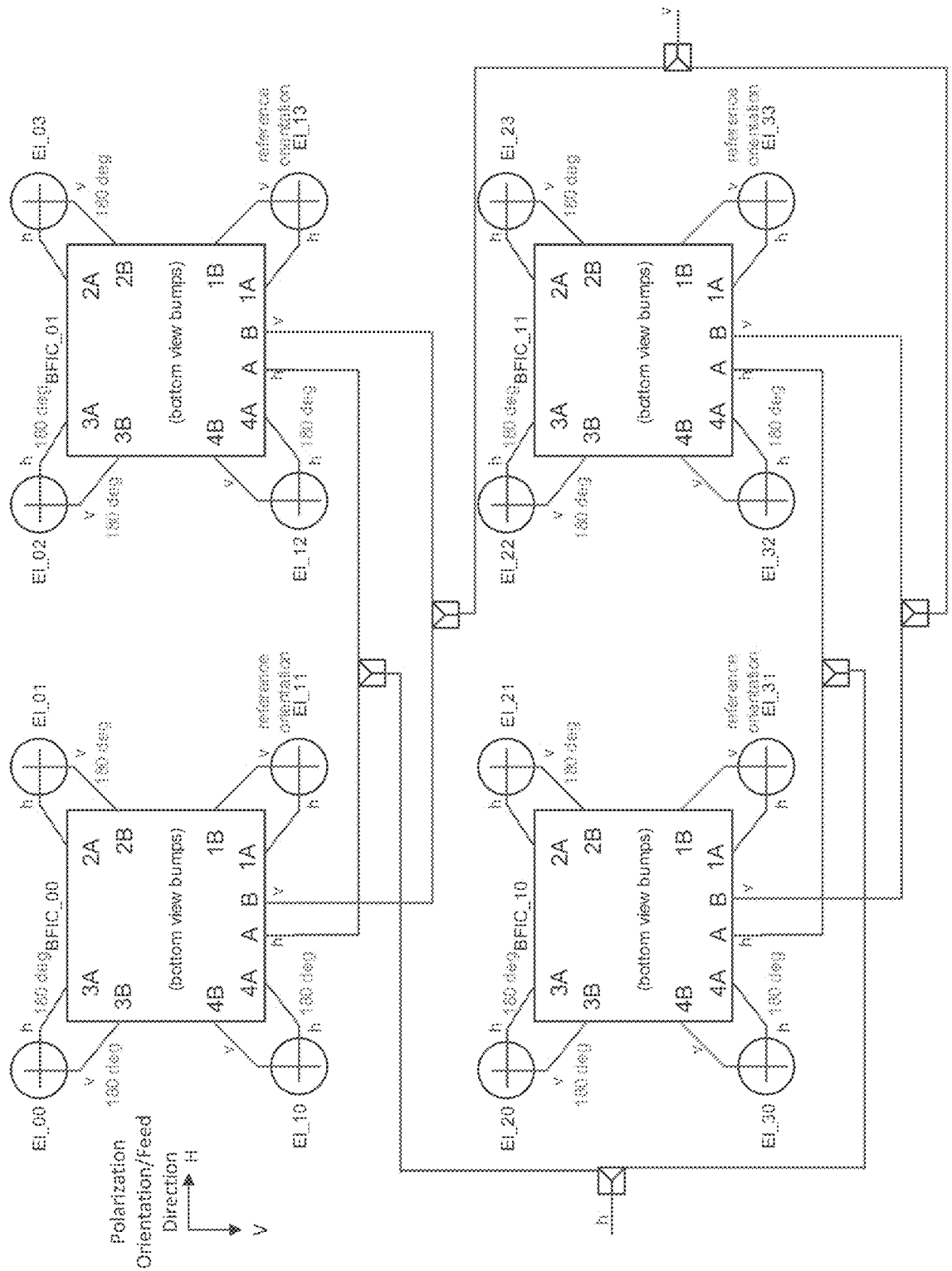
FIG. 8 is a schematic diagram showing a conceptual arrangement of BFIC chips and antennas in a phased array in accordance with the arrangement and orientation shown in FIG. 6.

FIG. 8 is a schematic diagram showing a conceptual arrangement of BFIC chips and antennas in a phased array in accordance with the arrangement and orientation shown in FIG. 6. In this example, all of the BFIC chips are oriented the same way (i.e., the nominal 0° orientation), which can complicate routing of the signals to/from the BFIC chips.

It should be noted that in some situations, it may be necessary to add a 180 degree phase rotation on a per-element or per-port basis such as, for example, to orient polarization feeds in the same direction or when an antenna element or BFIC chip is physically rotated 180 degrees on the PCB.

Figure 14:
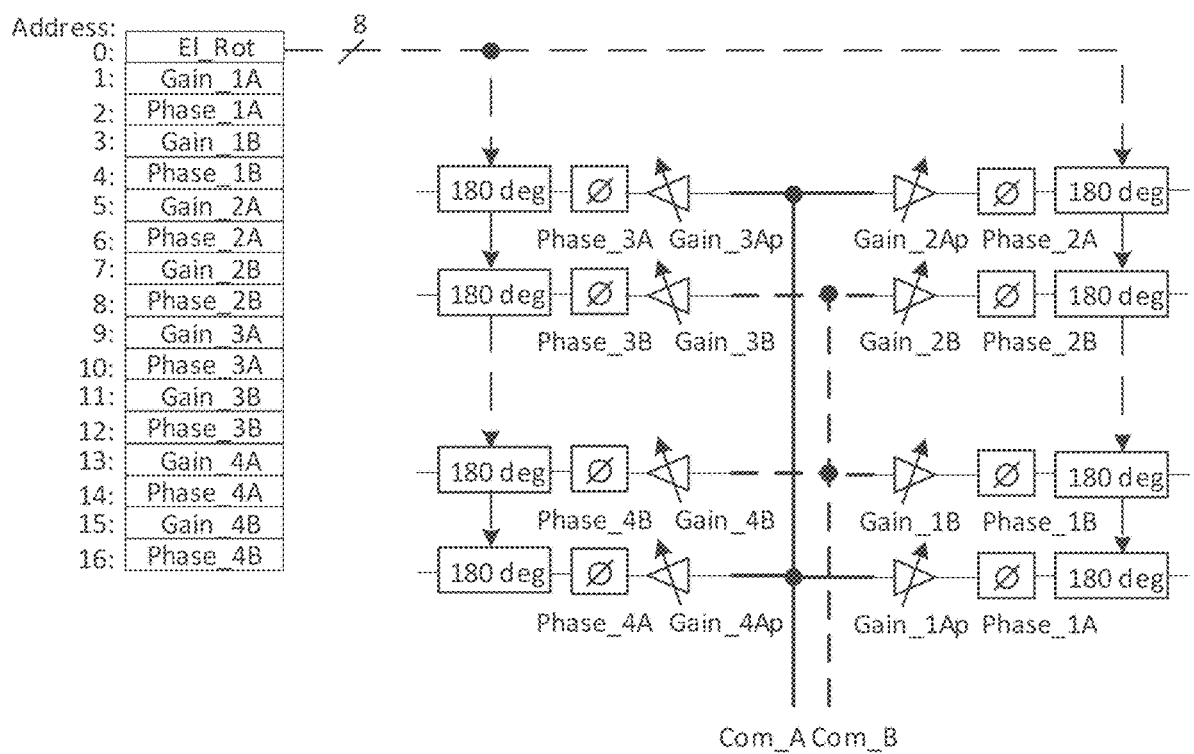
FIG. 14 is a schematic diagram showing phase rotation circuitry, in accordance with one exemplary embodiment.

In the example shown in FIG. 8, each dual-polarized antenna has two ports (labeled "h" for horizontal polarization and "v" for vertical polarization) feeding two orthogonal elements. Generally speaking, all elements of one polarization in a phased array must be physically oriented in the same direction and fed in the same direction. FIG. 8 includes a legend showing the nominal horizontal and vertical polarization orientation/feed directions for this exemplary embodiment, i.e., the horizontal elements are to be fed from left-to-right and the vertical elements are to be fed from top-to-bottom. As can be seen, for example, with reference to BFIC_00, the feeds for horizontal elements El_00 and El_10 are physically from right-to-left and the feeds for vertical elements El_00 and El_01 are physically from bottom-to-top, i.e., these feeds are reversed by 180 degrees from the nominal orientation/feed directions. Therefore, in this exemplary embodiment, each element/port includes a separate programmable (in or out) 180 degree phase shifter that is controllable through an element rotation (El_Rot) parameter, which, for example, may be a one bit "on/off" value for each element/port. FIG. 14 is a schematic diagram showing 180 degree phase shifter circuitry, in accordance with one exemplary embodiment. Here, the El_Rot parameter is an 8-bit register or value, with each bit corresponding to the El_Rot parameter for a different element/port. Because the physical orientation and connections of the BFICs are fixed, the El_Rot parameters generally only need to be configured once, e.g., at power-on. It should be noted that the El_Rot parameters can be provided in any of a number of ways, such as, for example and without limitation, written to a register by the controller, pre-stored in a non-volatile memory (e.g., during product manufacture), read from signal lines on the printed circuit board, encoded in or associated with a model number or board layout identifier (e.g., a set of El_Rot parameters for each of a number of different product models), etc. It also should be noted that the 180 degree phase shift instead could be combined with the digital phase shifter as opposed to being a separate circuit, e.g., the 180 degree phase shift could be computed by an on-chip circuit or controller based on the configured phase parameter.

One potential issue with the arrangement shown in FIG. 8 is that it can complicate routing of the signals to/from the BFIC chips. Therefore, in typical embodiments, BFIC chips are oriented in different ways (e.g., rotated relative to the reference orientation shown in FIG. 6) and also interconnected in different ways, which can simplify PCB layout (e.g., routing of signals to/from the BFICs) such as by avoiding vias and crossovers in the critical RF routing paths and avoiding the need to do extra length matching of traces.

Figure 9:
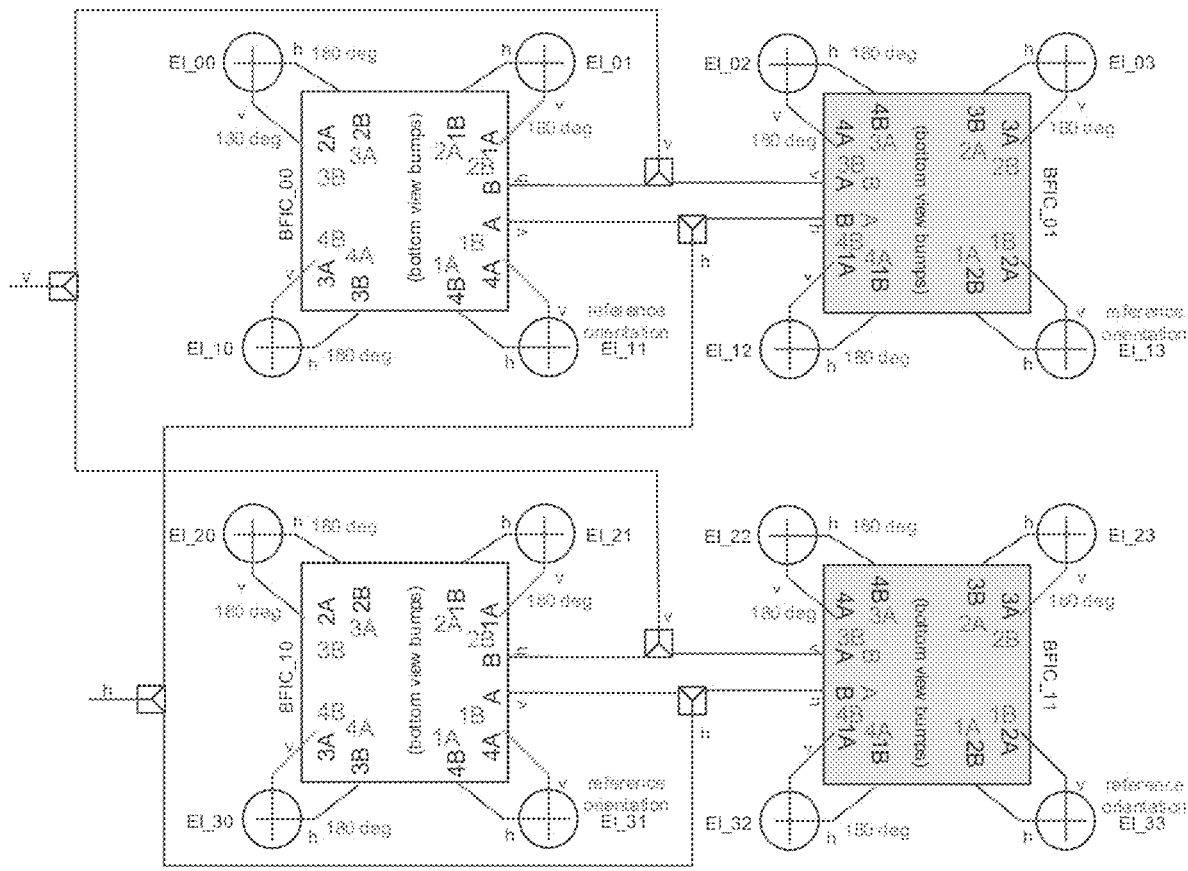
FIG. 9 is a schematic diagram showing an alternative arrangement of the BFIC chips and antennas of FIG. 8 in which the BFIC chips are rotated to simplify PCB layout, in accordance with one exemplary embodiment.

FIG. 9 is a schematic diagram showing an alternative arrangement of the BFIC chips and antennas of FIG. 8 in which the BFIC chips are rotated to simplify PCB layout, in accordance with one exemplary embodiment. Specifically, in this example, the BFIC chips identified as BFIC_00 and BFIC_10 are rotated by −90° and the BFIC chips identified as BFIC_01 and BFIC_11 are rotated by +90° relative to the reference orientation shown in FIG. 6. As can be seen, the rotation of the BFICs changes both the physical and logical positions of the various ports. For convenience, the physical positions of the ports (i.e., common ports A and B as well as RF ports 1A/1B, 2A/2B, 3A/3B, and 4A/4C) are identified in black, while the logical positions of the ports are identified in green (or gray if the drawings are rendered in grayscale).

For example, with reference to the BFIC chip identified as BFIC_00, element EL_00 is now associated with physical RF ports 2A and 2B (which logically map to reference RF ports 3B and 3A, respectively), element El_01 is now associated with physical RF ports 1A and 1B (which logically map to reference RF ports 2B and 2A, respectively), element EL_10 is now associated with physical RF ports 3A and 3B (which map to reference RF ports 4B and 4A, respectively), and element El_11 is now associated with physical RF ports 4A and 4B (which map to reference RF ports 1B and 1A, respectively). The BFIC chip identified as BFIC_10 has a similar translation relative to elements El_20, El_21, El_30, and El_31.

Similarly, with reference to the BFIC chip identified as BFIC_01, element EL 02 is now associated with physical RF ports 4A and 4B (which logically map to reference RF ports 3B and 3A, respectively), element El_03 is now associated with physical RF ports 3A and 3B (which logically map to reference RF ports 2B and 2A, respectively), element EL_12 is now associated with physical RF ports 1A and 1B (which map to reference RF ports 4B and 4A, respectively), and element El_13 is now associated with physical RF ports 2A and 2B (which map to reference RF ports 1B and 1A, respectively). The BFIC chip identified as BFIC_11 has a similar translation relative to elements El_22, El_23, El_32, and El_33.

Thus, compared to the reference orientation, the alternative arrangement shown in FIG. 9 includes aspects of channel swapping (i.e., a channel A port maps to a channel B port, and vice versa) as well as element swapping (i.e., each physical port number maps to a different logical port number). Because of these types of translations, different sets of parameters generally need to be calculated for different BFICs, which can be time-consuming, error-prone, and difficult to validate.

Therefore, certain exemplary embodiments include on-chip channel swapping circuitry to physical or logically swap the A/B channels. Channel swapping can be controlled through a single register and can be accomplished using digital switching or RF switching.

Figure 10:
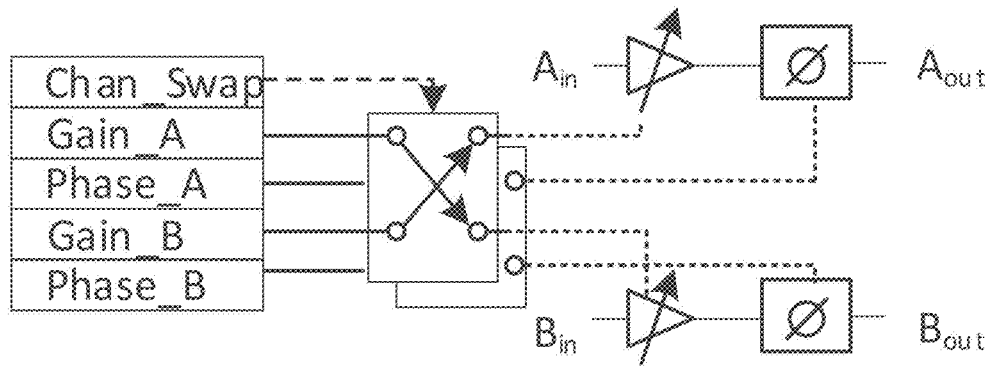
FIG. 10 is a schematic diagram showing digital channel swapping circuitry, in accordance with one exemplary embodiment.

FIG. 10 is a schematic diagram showing digital channel swapping circuitry, in accordance with one exemplary embodiment. This channel swapping circuitry performs switching such that, for each RF port, channel A parameters are routed to channel B and channel B parameters are routed to channel A based on a channel swap (Chan_Swap) parameter. In this exemplary embodiment, the channel swapping circuitry generally would include one switch for each A/B parameter pair, e.g., a switch for Gain_1A/Gain_1B, a switch for Phase_1A/Phase_1B, a switch for Gain_2A/

Gain_2B, a switch for Phase_2A/Phase_2B, a switch for Gain_3A/Gain_3B, a switch for Phase_3A/Phase_3B, a switch for Gain_4A/Gain_4B, and a switch for Phase_4A/Phase_4B for a configuration of the type shown in FIG. 7.

Figure 11:
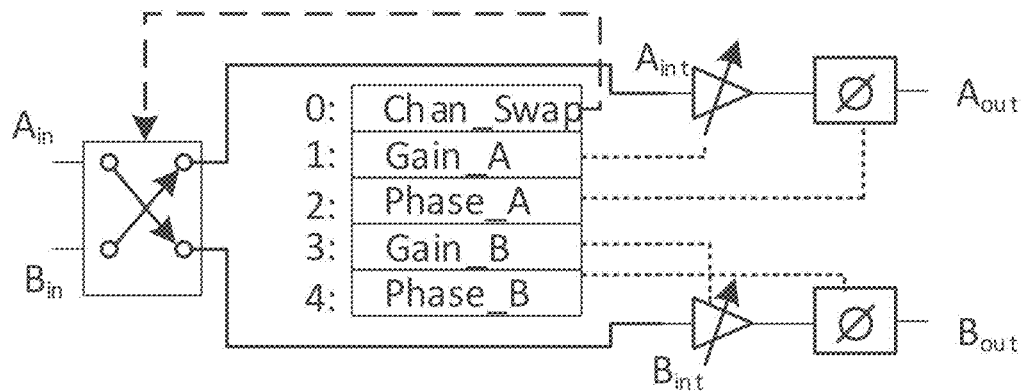
FIG. 11 is a schematic diagram showing RF channel swapping circuitry, in accordance with one exemplary embodiment.

FIG. 11 is a schematic diagram showing RF channel swapping circuitry, in accordance with one exemplary embodiment. This channel swapping circuitry includes a switch that is used to physically switch the channel A and channel B signal paths under control of the Chan_Swap parameter.

Generally speaking, the Chan_Swap parameter for each BFIC would only have to be configured once, e.g., at startup, based on the arrangement and orientation of the BFICs. The Chan_Swap parameter may be a one bit "on/off" value for the BFIC. It should be noted that the Chan_Swap parameter can be provided in any of a number of ways, such as, for example and without limitation, written to a register by the controller, pre-stored in a non-volatile memory (e.g., during product manufacture), read from signal lines on the printed circuit board, encoded in or associated with a model number or board layout identifier (e.g., a Chan_Swap parameter for each of a number of different product models), etc.

Certain exemplary embodiments additionally or alternatively include on-chip element swapping circuitry. Element swapping can be controlled through a single register and can be accomplished using digital switching.

Figure 12:
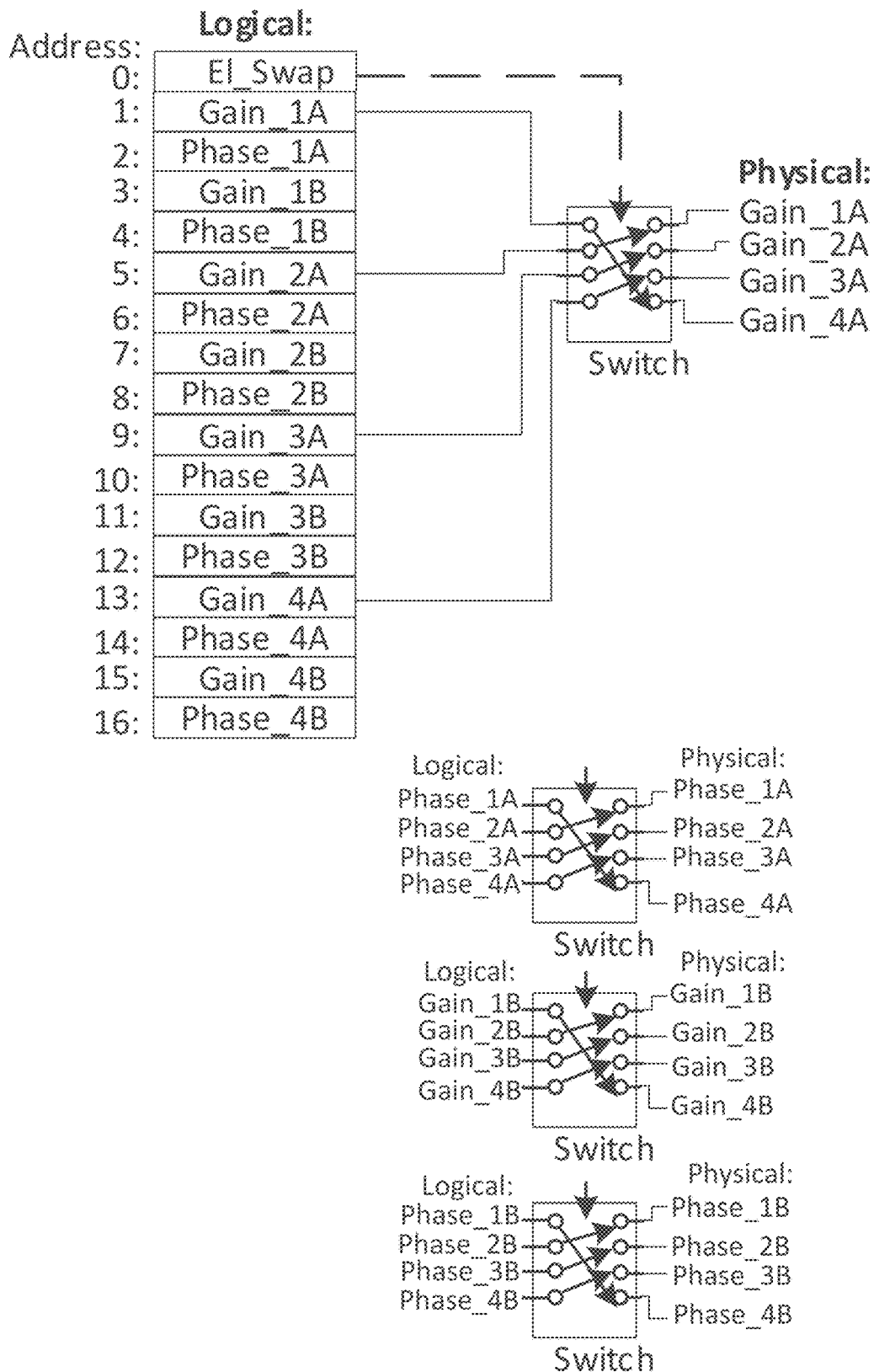
FIG. 12 is a schematic diagram showing digital element swapping circuitry, in accordance with one exemplary embodiment.

FIG. 12 is a schematic diagram showing digital element swapping circuitry, in accordance with one exemplary embodiment. This element swapping circuitry performs switching such that each set of corresponding parameters (e.g., Gain_xA, Phase_xA, Gain_xB, and Phase_xB for a configuration of the type shown in FIG. 7, where x=1 to 4) is switched based on a port mapping under control of an element swap (El_Swap) parameter. In this exemplary embodiment, the element swapping circuitry generally would include one switch for each parameter set, i.e., four switches for a configuration of the type shown in FIG. 7 as depicted in FIG. 12. It should be noted that the port mapping can be configurable or selectable. In the example shown in FIG. 12, port 1 parameters are switched to port 4, port 2 parameters are switched to port 1, port 3 parameters are switched to port 2, and port 4 parameters are switched to port 3, which would be an appropriate port mapping for BFIC_00 and BFIC_10 shown in FIG. 9. However, the port mapping for BFIC_01 and BFIC_11 shown in FIG. 9 would map port 1 parameters to port 2, port 2 parameters to port 3, port 3 parameters to port 4, and port 4 parameters to port 1. Programmable switches could be used in order to have common element swapping circuitry that supports multiple port mappings, which then could be configurable or selectable (e.g., having a number of preconfigured port mappings selectable using the El_Swap parameter (e.g., El_Swap=00 for a first port mapping, El_Swap=01 for a second port mapping, etc.).

Generally speaking, the El_Swap parameter for each BFIC would only have to be configured once, e.g., at startup, based on the arrangement and orientation of the BFICs. The El_Swap parameter may be a one bit "on/off" value for the BFIC. It should be noted that the El_Swap parameter can be provided in any of a number of ways, such as, for example and without limitation, written to a register by the controller, pre-stored in a non-volatile memory (e.g., during product manufacture), read from signal lines on the printed circuit board, encoded in or associated with a model number or board layout identifier (e.g., an El_Swap parameter for each of a number of different product models), etc.

Of course, certain exemplary embodiments can include both channel swapping circuitry and element swapping circuitry of the types discussed above.

Figure 13:
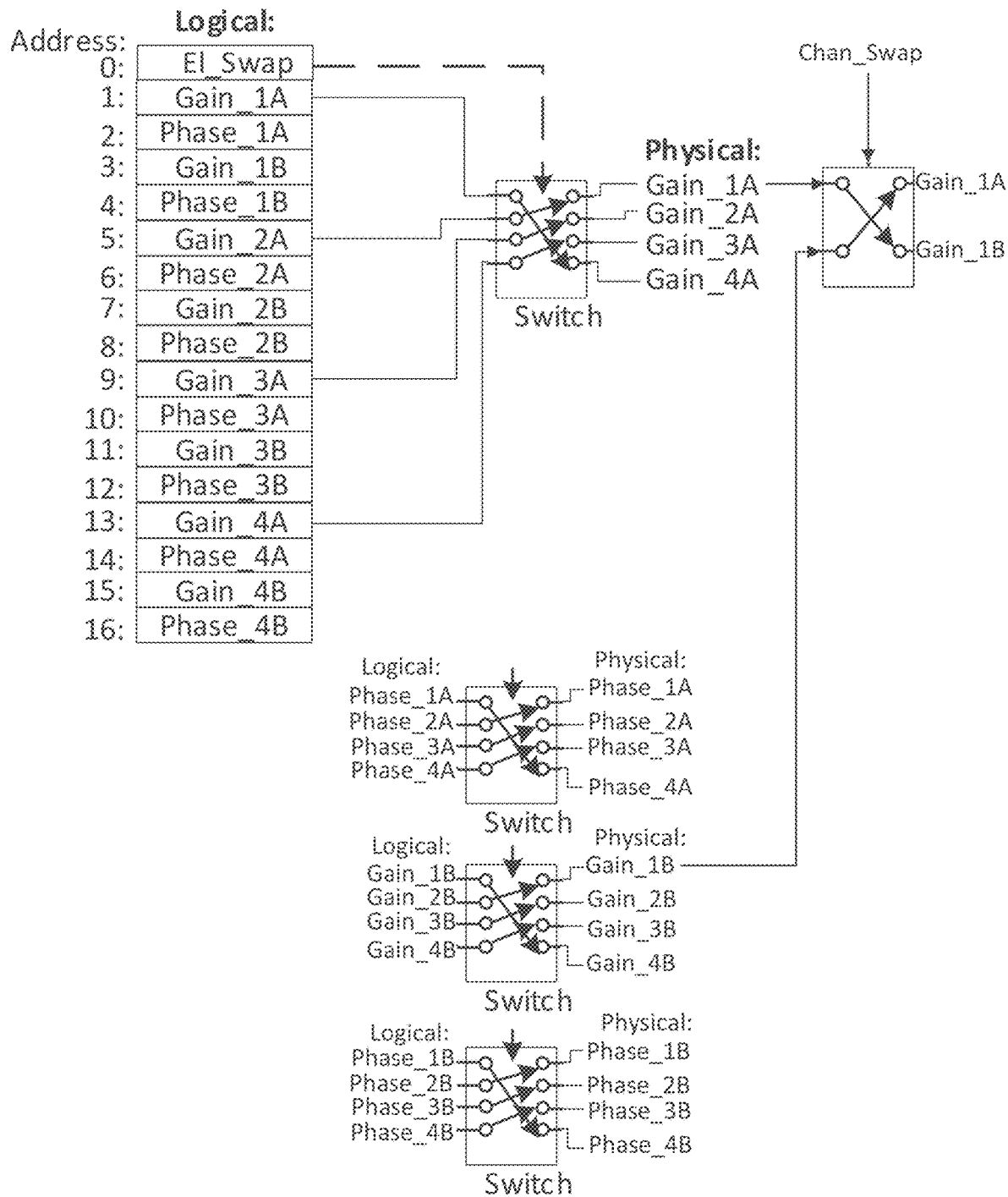
FIG. 13 is a schematic diagram showing combined element swapping and channel swapping circuitry, in accordance with one exemplary embodiment.

FIG. 13 is a schematic diagram showing combined element swapping and channel swapping circuitry, in accordance with one exemplary embodiment. Here, element swapping is selectively performed under control of the El_Swap parameter, and channel swapping is selectively performed under control of the Chan_Swap parameter. For convenience, this example only shows channel swapping circuitry for one A/B parameter pair post element swapping (i.e., Gain_1A/Gain_1B output by the corresponding element swapping switches), although the channel swapping circuitry generally would include one switch for each A/B parameter pair, e.g., a switch for Gain_1A/Gain_1B, a switch for Phase_1A/Phase_1B, a switch for Gain_2A/Gain_2B, a switch for Phase_2A/Phase_2B, a switch for Gain_3A/Gain_3B, a switch for Phase_3A/Phase_3B, a switch for Gain_4A/Gain_4B, and a switch for Phase_4A/Phase_4B in this exemplary embodiment. Assuming both element swapping and channel swapping are enabled, the result in this example would be for the Gain_2A parameter to be mapped through element swapping followed by channel swapping to physical Gain_1B and for the Gain_2B parameter to be mapped through element swapping followed by channel swapping to physical Gain_1A.

Of course, RF switching could be used in lieu of digital switching for the channel swapping, e.g., with the RF channel swapping performed before element swapping.

One advantage of using element swapping and/or channel swapping is that a common set of parameters can be programmed into a number of BFICs and then translated on-chip based on the orientation of the BFICs relative to the reference orientation. For example, gain and phase parameters could be computed for the nominal orientation and programmed into the BFICs, and then each BFIC could be programmed as to element swapping and/or channel swapping based on the orientation of the BFIC relative to the reference orientation so that each BFIC performs any necessary translations on-chip based on the configurations.

It should be noted that while the examples presented above are based on the 0° orientation as a frame of reference, the present invention is not limited to using the 0° orientation as a frame of reference and instead another orientation (e.g., one of the rotated BFICs) can be used as a frame of reference. Thus, for example, with reference again to FIG. 9, BFIC_01 and BFIC_11 can be used as frames of references, in which case BFIC_00 and BFIC_01 would be rotated 180° from those reference orientations, and the on-chip element swapping circuitry could be configured to translate this 180° rotation as opposed to translating +90° and −90° rotations.

It is contemplated that a single "orientation" parameter could be used to control both element swapping and channel swapping in certain exemplary embodiments based on the orientation of the BFIC relative to the orientation used to generate the parameters. For example, an "orientation" parameter could be used to select from, say, 0°, +90°, 180°, and −90° orientations, and the BFIC element swapping and channel swapping circuitry could be configured based on the "orientation" parameter (e.g., whether or not element swapping is enabled and if so optionally including a port mapping configuration, and whether or not channel swapping is enabled).

It should be noted that while exemplary embodiments are described above with reference to gain and phase parameters for each RF signal path, alternative embodiments can use the same mechanisms to support different and/or additional parameters such as, for example, separate calibration parameters for each RF signal path. It should be noted that some calibration parameters might be element swapped while other calibration parameters are not element swapped. Similarly, it should be noted that some calibration parameters might be channel swapped while other calibration parameters are not channel swapped.

Of course, embodiments can include any combination of element swapping circuitry, channel swapping circuitry, and element rotation circuitry.

It is envisioned that certain exemplary embodiments of the types described herein can allow common software and common parameter configurations to be used across multiple products having different BFIC and element arrangements and configurations simply by providing appropriate El_Swap, Chan_Swap, and El_Rot parameters to the BFICs in a given product.

While exemplary embodiments are described above with reference to element swapping, channel swapping, and phase rotation in a BFIC, it should be noted that the disclosed concepts and circuitry can be applied to RFICs generally, e.g., including element swapping, channel swapping, and/or phase rotation in CDICs and/or IFICs of the types described herein.

It should be noted that element and/or channel swapping can be applied to other types of on-chip circuitry such as, for example, temperature compensation circuitry of the type described above with reference to FIG. 5 and power detection circuitry that may be included in certain RFICs.

For one example, each channel or element signal path may include temperature compensation circuitry having a temperature sensor that writes sensed temperature values into a corresponding temperature compensation register, e.g., temperature compensation circuitry in the common port A signal path that writes sensed temperature values to a channel A temperature compensation register and temperature compensation circuitry in the common port B signal path that writes sensed temperature values to a channel B temperature compensation register. In this case, the RFIC may include switching circuitry to selectively swap the channel A and channel B temperature compensation registers, e.g., based on the Chan_Swap parameter. Thus, for example, if the channels A and B are swapped in the PCB layout, the temperature compensation registers also could be swapped accordingly. Such switching circuitry could be physically or logically placed either before or after the temperature compensation registers, e.g., the channel A temperature compensation circuitry could write the sensed temperature values into the channel A temperature compensation register which is subsequently switched to channel B circuitry and vice versa, or the channel A temperature compensation circuitry could write a sensed temperature value that is switched to the channel B temperature compensation register and vice versa. If temperature compensation circuitry is included on the element signal paths, then this switching could be performed on an element-by-element basis, for example, similar to channel swapping shown and described with reference to FIGS. 10 and 11.

For another example, each channel or element signal path may include power detection circuitry that writes sensed power values into a corresponding power detection register, e.g., power compensation circuitry in the element 1A signal path that writes sensed power values to an element 1A power detection register, power compensation circuitry in the element 1B signal path that writes sensed power values to an element 1B power detection register, power compensation circuitry in the element 2A signal path that writes sensed power values to an element 2A power detection register, and so on. In this case, the RFIC may include switching circuitry to selectively swap the power compensation registers. Thus, for example, if elements A and B are swapped for a particular port, the power compensation registers for that port also could be swapped accordingly, and if ports are swapped (e.g., port 1 switched to port 4), the power compensation registers also could be swapped accordingly. Such switching circuitry could be physically or logically placed either before or after the power compensation registers, e.g., the port A power compensation circuitry could write the sensed power values into the element A power compensation register which is subsequently switched to element B and vice versa, or the element A power compensation circuitry could write a sensed power value that is switched to element B power compensation register and vice versa. If power compensation circuitry is included on the common port signal paths, then this switching could be performed on a channel basis, e.g., based on the Chan_Swap parameter.

It should be noted that the channel and element swapping concepts described herein can be performed using physical and/or logical switching. Some examples of physical and logical switching are described herein, although it should be noted that embodiments are not limited thereby.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims.

Without limitation, potential subject matter that may be claimed (prefaced with the letter "P" so as to avoid confusion with the actual claims presented below) includes:

P1. An RFIC chip comprising programmable channel swapping circuitry.

P2. The RFIC chip of claim P1, wherein the channel swapping circuitry is configured to digitally control which software parameters are applied to which channel groups.

P3. The RFIC chip of claim P1, wherein the channel swapping circuitry is configured to swap RF signal path inputs or outputs.

P4. An RFIC chip comprising programmable element swapping circuitry.

P5. The RFIC chip of claim P4, wherein the element swapping circuitry is configured to digitally control which software parameters are applied to which signal paths.

P6. An RFIC chip comprising programmable phase rotation circuitry allowing 180 degree phase rotation to be selected for each of a number of ports or elements based on an orientation-based parameter.

P7. An RFIC chip including one or more of programmable element swapping circuitry, programmable channel swapping circuitry, and programmable phase rotation circuitry.

P8. An RFIC chip according any of claims P1 to P7, wherein the RFIC is a beam forming integrated circuit.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. An RFIC chip comprising:
 a common interface circuit including a first common interface and a second common interface;
 at least one element interface circuit coupled to the common interface circuit, each element interface circuit including a first element interface including a first 180 degree phase shifter and a second element interface including a second 180 degree phase shifter;
 programmable channel swapping circuitry configured to selectively switch between a first channel configuration and a second channel configuration based on a channel swap parameter, the first channel configuration coupling the first common interface to the first element interface of each element interface circuit and coupling the second common interface to the second element interface of each element interface circuit, the second channel configuration coupling the first common interface to the second element interface of each element interface circuit and coupling the second common interface to the first element interface of each element interface circuit;
programmable phase rotation circuitry configured to selectively enable or disable the 180 degree phase shifter of each element interface based on a corresponding element rotation parameter;
at least one memory storing, for each element interface circuit, a first set of gain and phase parameters and a second set of gain and phase parameters; and
parameter swapping circuitry configured to selectively switch each element interface circuit between a first parameter configuration corresponding to the first channel configuration and a second parameter configuration corresponding to the second channel configuration based on the channel swap parameter, the first parameter configuration providing the first set of parameters to the first element interface and providing the second set of parameters to the second element interface, the second parameter configuration providing the first set of parameters to the second element interface and providing the second set of parameters to the first element interface.

2. An RFIC chip according to claim 1, wherein the programmable channel swapping circuitry comprises switching circuitry having a first input coupled to the first common interface, a second input coupled to the second common interface, a first output coupled to the first element interface of each element interface circuit, a second output coupled to the second element interface of each element interface circuit, and a switch for selectively switching between a first switch configuration and a second switch configuration based on the channel swap parameter, the first switch configuration corresponding to the first channel configuration and coupling the first switch input to the first switch output and coupling the second switch input to the second switch output, the second switch configuration corresponding to the second channel configuration and coupling the first switch input to the second switch output and coupling the second switch input to the first switch output.

3. An RFIC chip according to claim 1, wherein the parameter swapping circuitry comprises:
first switching circuitry configured to selectively switch the gain parameters; and
second switching circuitry configured to selectively switch the phase parameters.

4. An RFIC chip according to claim 1, wherein the at least one element interface circuit comprises a plurality of element interface circuits.

5. A phased array system comprising:
at least one RFIC chip according to claim 1; and
a set of RF elements, wherein each of the first element interface and the second element interface of each element interface circuit is coupled to an RF element of the set of RF elements.

6. A phased array system according to claim 5, wherein the programmable channel swapping circuitry of at least one RFIC chip comprises switching circuitry having a first input coupled to the first common interface, a second input coupled to the second common interface, a first output coupled to the first element interface of each element interface circuit, a second output coupled to the second element interface of each element interface circuit, and a switch for selectively switching between a first switch configuration and a second switch configuration based on the channel swap parameter, the first switch configuration corresponding to the first channel configuration and coupling the first switch input to the first switch output and coupling the second switch input to the second switch output, the second switch configuration corresponding to the second channel configuration and coupling the first switch input to the second switch output and coupling the second switch input to the first switch output.

7. A phased array system according to claim 5, wherein the parameter swapping circuitry comprises:
first switching circuitry configured to selectively switch the gain parameters; and
second switching circuitry configured to selectively switch the phase parameters.

8. A phased array system according to claim 5, wherein the at least one element interface circuit of at least one RFIC chip comprises a plurality of element interface circuits.

9. A phased array system according to claim 5, wherein the first element interface of a given element interface circuit is coupled to a first polarization interface of a given RF element and wherein the second element interface of the given element interface circuit is coupled to a second polarization interface of the given RF element.

10. An RFIC chip comprising:
a common interface circuit including a first common interface and a second common interface;
a plurality of element interface circuits coupled to the common interface circuit, each element interface circuit including a first element interface including a first 180 degree phase shifter and a second element interface including a second 180 degree phase shifter;
programmable channel swapping circuitry configured to selectively switch between a first channel configuration and a second channel configuration based on a channel swap parameter, the first channel configuration coupling the first common interface to the first element interface of each element interface circuit and coupling the second common interface to the second element interface of each element interface circuit, the second channel configuration coupling the first common interface to the second element interface of each element interface circuit and coupling the second common interface to the first element interface of each element interface circuit;
programmable phase rotation circuitry configured to selectively enable or disable the 180 degree phase shifter of each element interface based on a corresponding element rotation parameter;
at least one memory storing a set of gain and phase parameters for each element interface circuit including at least a first set of gain and phase parameters for a first element interface circuit and a second set of gain and phase parameters for a second element interface circuit; and
programmable element swapping circuitry configured selectively switch between a first element configuration and a second element configuration based on an element swap parameter, the first element configuration providing the first set of gain and phase parameters to the first element interface circuit and providing the second set of gain and phase parameters to the second element interface circuit, the second element configuration providing the first set of gain and phase parameters to the second element interface circuit and providing the second set of gain and phase parameters to the first element interface circuit.

11. An RFIC chip according to claim 10, wherein the element swapping circuitry is configured to digitally switch the sets of parameters.

12. An RFIC chip according to claim 10, wherein the element swapping circuitry and the channel swapping circuitry are controlled through a common parameter.

13. An RFIC chip according to claim 12, wherein the common parameter is an orientation parameter based on an orientation of the RFIC chip relative to a reference orientation.

14. An RFIC chip according to claim 13, wherein the orientation parameter indicates an angle of rotation from the reference orientation.

15. A phased array system comprising:
at least one RFIC chip according to claim 10; and
a set of RF elements, wherein each of the first element interface and the second element interface of each element interface circuit is coupled to an RF element of the set of RF elements.

16. A phased array system according to claim 15, wherein the element swapping circuitry is configured to digitally switch the sets of parameters.

17. A phased array system according to claim 15, wherein the element swapping circuitry and the channel swapping circuitry are controlled through a common parameter.

18. A phased array system according to claim 17, wherein the common parameter is an orientation parameter based on an orientation of the RFIC chip relative to a reference orientation.

19. A phased array system according to claim 18, wherein the orientation parameter indicates an angle of rotation from the reference orientation.

20. A phased array system according to claim 15, wherein the first element interface of a given element interface circuit is coupled to a first polarization interface of a given RF element and wherein the second element interface of the given element interface circuit is coupled to a second polarization interface of the given RF element.

* * * * *